March 11, 1947. H. HOOVER, JR 2,417,077
SEISMOMETER
Original Filed July 28, 1939   2 Sheets-Sheet 1
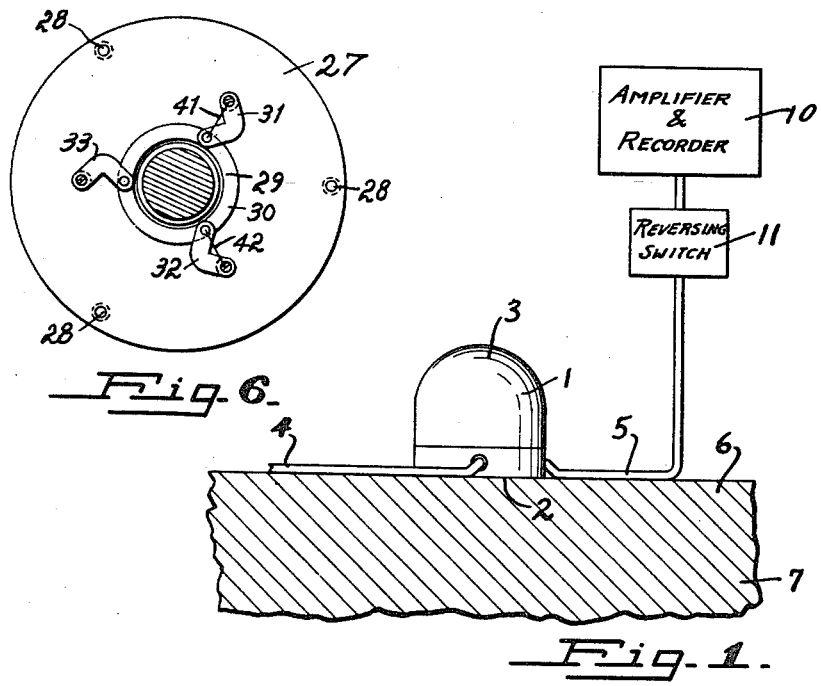
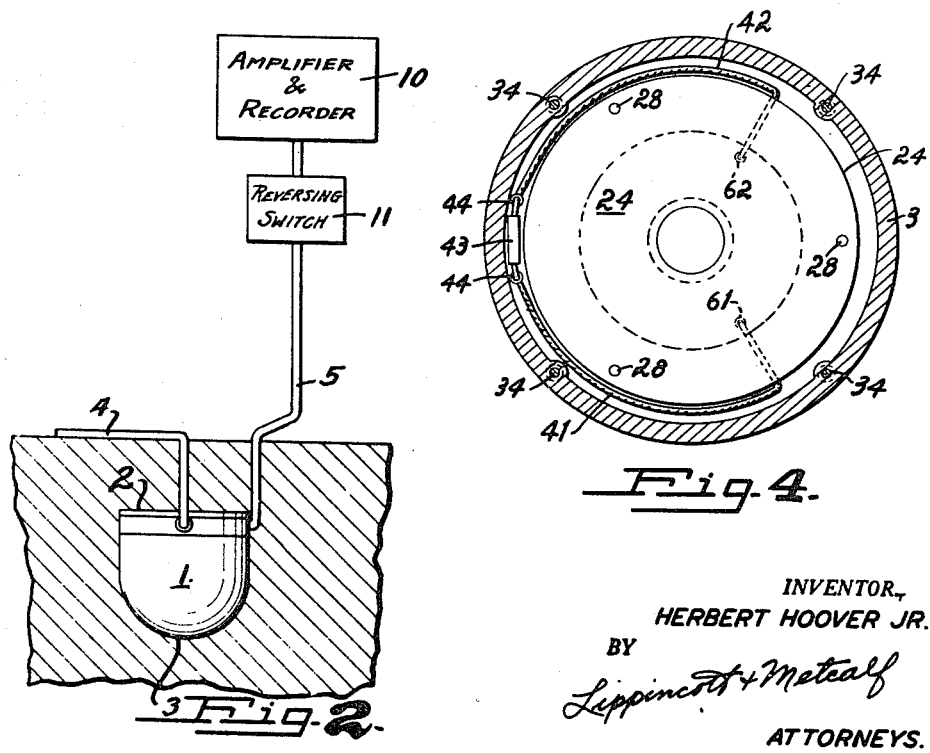
INVENTOR,
HERBERT HOOVER JR.
BY
Lippincott & Metcalf
ATTORNEYS.

March 11, 1947.   H. HOOVER, JR   2,417,077
SEISMOMETER
Original Filed July 28, 1939   2 Sheets-Sheet 2

INVENTOR,
HERBERT HOOVER JR.
BY
Lippincott & Metcalf
ATTORNEYS.

Patented Mar. 11, 1947

2,417,077

UNITED STATES PATENT OFFICE 2,417,077

SEISMOMETER

Herbert Hoover, Jr., Sierra Madre, Calif., assignor, by mesne assignments, to United Geophysical Company, Inc., Pasadena, Calif., a corporation of California Original application July 28, 1939, Serial No. 287,073, now Patent No. 2,307,792, dated January 12, 1943. Divided and this application October 13, 1942, Serial No. 461,888

4 Claims. (Cl. 177—352)

This invention relates to seismic exploration, and is a division of my application, Serial No. 287,073, filed July 28, 1939, for patent on seismometer and which has issued Jan. 12, 1943, as Patent No. 2,307,792.

Among the objects of my invention are the following:

(a) To provide a seismometer which can be used either upright or upside down without loss in sensitivity.

(b) To provide a seismometer adapted for detecting seismic waves with substantially equal sensitivity when said seismometer is planted either on the surface of the earth or at the bottom of a hole in which it is placed or buried.

(c) To provide a seismometer which when placed with its end on the surface of the earth offers little wind resistance and hence is not subject to strong wind disturbances.

(d) To provide a seismometer with a hermetic seal to prevent leakage of fluid into the seismometer.

(e) To provide a seismometer which may be operated in any of a plurality of positions with equal sensitivity.

Other objects of my invention will be apparent or will be specifically pointed out in the description forming a part of this specification, but I do not limit myself to the embodiment of the invention herein described, as various forms may be adopted within the scope of the claims.

Referring to the drawings:

Fig. 1 is a schematic view of my seismometer planted on the surface of the earth, together with an associated seismic wave reproducing channel.

Fig. 2 is a schematic view of my seismometer planted beneath the surface of the earth, together with the associated seismic wave reproducing channel.

Fig. 4 is a plan view partly in section taken along the line 4—4 of Fig. 3.

Fig. 6 is a detail bottom view of my seismometer with base plate and cover plate removed and showing one method of mounting a moving coil in my seismometer.

Figure 3:
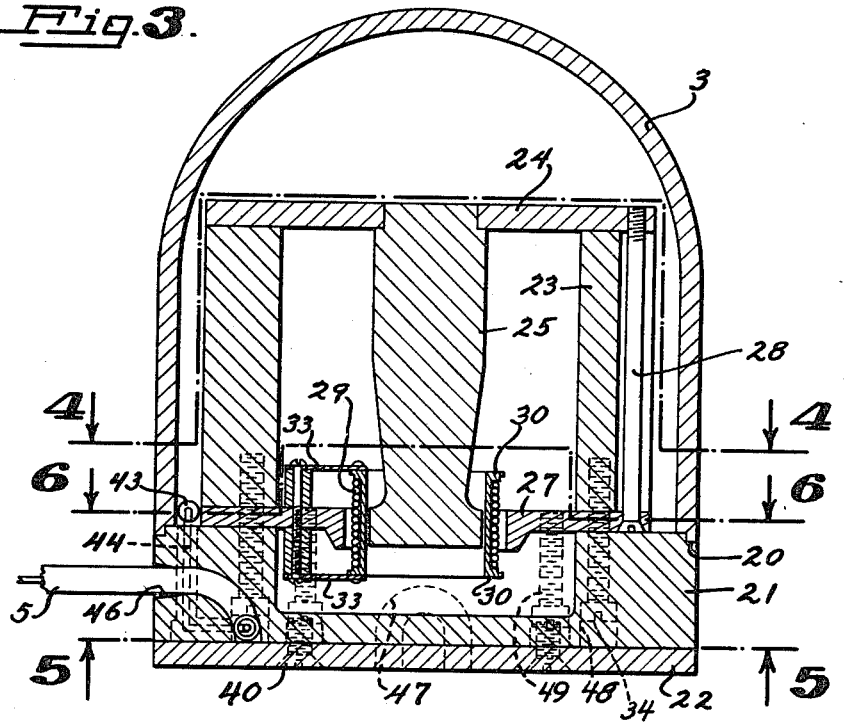
Fig. 3 is a central vertical section of the interior of one embodiment of my invention.

As illustrated in Figs. 1, 2 and 3 the general external features of my seismometer 1 are a flat surface on one end 2, a dome shape on the other end 3, a carrying rope 4, and a cable 5. Said carrying rope 4 and cable 5 are attached to the seismometer adjacent its flat end so as to permit solid contact of the flat end 2 when planted on the surface of the earth 7 and to offer a minimum amount of wind resistance when thus planted, as shown in Fig. 1. When planted in this manner my seismometer is subject to a minimum amount of wind disturbance partly because the rope 4 and cable 5 lie in direct contact with the earth except for a very short portion next to the seismometer case and partly because wind currents readily flow over the smooth dome 3.

When I desire to plant my seismometer beneath the earth's surface I dig a hole which has a dome shaped or round bottom, place the dome end of my seismometer in contact with said bottom so as to form a firm contact with the soil and cover the seismometer with soil, thus forming a plant as shown in Fig. 2. It is clear that when planted beneath the surface in this manner my seismometer provides firm contact with the ground at all points and disturbances due to any vibration of loose soil are avoided.

As is well known in the art, a seismometer converts earth motion into corresponding electromotive forces which are amplified and recorded by apparatus symbolized by 10 in Figs. 1 and 2. The records produced are oscillograph traces which accordingly represent ground motion. In order to provide a one to one correlation between the direction of ground movement and the direction of displacement of such an oscillograph trace I utilize a reversing switch 11 to reverse the connections of cable 5 and the amplifier 10 when I change from a surface plant of Fig. 1 to a subsurface plant of Fig. 2.

Referring to Fig. 3, the dome shaped cover 3 forms an inset machine fit 20 with the main base plate 21; and 22 is a cover plate. Said dome 3, base plate 21, and cover plate 22 are made of non-magnetic material. Within the casing formed by the dome 3 and plate 21 is mounted an annular permanent magnet 23 having at one end an annular soft iron end plate 24 to which an annular soft iron pillar 25 is secured by a press fit, and at the other end an annular soft iron ring 27. Said ring 27 and said end plate 24 are secured to said annular magnet 23 by screws 28. An air gap is formed between the ring 27 and pillar 25 as shown in such a manner that magnetic flux flows through the gap radially and is substantially uniform throughout the width of the gap. An annular moving coil 29 comprising a copper winding in a brass cylindrical spool is flexibly suspended in said air gap. The copper winding itself is preferably longer than the vertical length of the air gap for reasons which will be pointed out below. As shown in Figs. 3 and 6 said coil 29 is mounted in spool 30—30 and the whole suspended from the end ring 27 by means of two spider type suspensions each comprising a set of springs 31, 32, and 33.

Referring to Fig. 4 the dome 3 is secured to plate 21 by screws 34. Leads 41 and 42 connected respectively to the winding of coil 29 at spring mounts 31 and 32 are connected to damping resistor 43.

Figure 5:
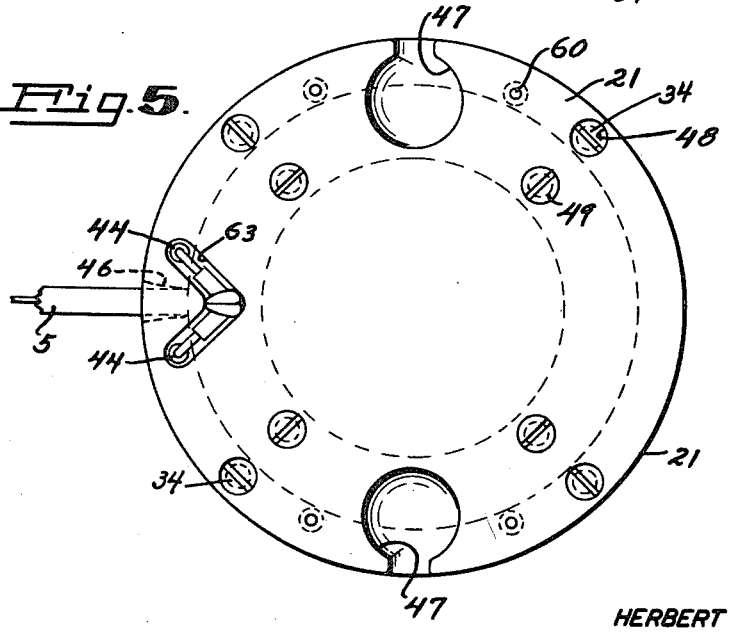
Fig. 5 is a bottom view of the base plate of my seismometer as viewed along line 5—5 of Fig. 3.

As illustrated in Fig. 5 said leads 41 and 42 pass through holes 44—44 in base plate 21 and connect with cable 5 in the V-shaped slot 63 and the cable passage 46. Base plate 21 has two round cavities 47 into which knotted ends of carrying rope 4 fit. Base plate 21 also has countersunk bores 48 through which dome holding screws 34 pass. In addition there are screws 49 for firmly mounting the ring 27, magnet 23, and end plate 24 within the case. Taps 60 are adapted to receive screws 40 for holding the cover plate 22 to the base plate 21.

I provide a hermetic seal by means of inset joint 20 and by filling holes 48, 44, and 46 with a high melting point asphalt or wax. Cover plate 22 serves to hold carrying rope 4 to the sides of the case and also protects the portion of cable 5, and leads 41 and 42 which lie in V-shaped slot 63. Said cover plate 22 and base plate 21 make possible easy replacement of said carrying rope 4 without breaking the seal of said seismometer.

In order to obtain substantially uniform sensitivity in either seismometer plant shown in Fig. 1 or 2, I use a dynamic type instrument as illustrated in which the mass of the moving coil is small and the natural period of said coil falls in the region of the lowest frequency seismic waves I expect to record. Such a suitable natural frequency lies at about 15 or 20 cycles. With a coil having such characteristics, the winding will cut almost all the flux passing through the air gap in both positions shown in Figs. 1 and 2 and also when the seismometer lies on its side or any other position.

I claim:
1. A portable seismometer comprising a case having a flat base and a substantially uninterrupted domed top, vibration-detecting means sealed within the case and adapted to detect movement thereof transverse to the base, said means including a light weight movably suspended coil with a natural frequency of about 15–20 cycles.

2. Apparatus according to claim 1 provided with a relatively limp vibration-free carrying handle.

3. A portable seismometer comprising a case having a flat base and a substantially uninterrupted domed top, vibration-detecting means sealed within the case and adapted to detect movement thereof transverse to the base, said means including a light-weight movably suspended coil with a natural frequency of about 15–20 cycles, and a looped relatively limp vibration-free carrying handle attached near the base so that the handle is supported by the ground when the instrument is in use.

4. A portable seismometer comprising a case having a flat base and a substantialy uninterrupted domed top, vibration-detecting means sealed within the case and adapted to detect movement thereof transverse to the base, said means including a light-weight movably suspended coil with a natural frequency of about 15–20 cycles, and relatively limp electrical leads adapted to be connected to an indicator and projecting from the side of the case adjacent the base so that they are supported principally by the ground when the seismometer is in use.

HERBERT HOOVER, JR.

REFERENCES CITED

The following references are of record in the file of this patent:

UNITED STATES PATENTS

| Number | Name | Date |
| --- | --- | --- |
| 2,171,173 | Coyer | Aug. 29, 1939 |
| 2,307,792 | Hoover | Jan. 12, 1943 |
| 2,021,330 | Ross et al. | Nov. 19, 1935 |
| 1,604,693 | Hecht et al. | Oct. 26, 1926 |
| 2,255,946 | Smith | Sept. 16, 1941 |